United States Patent [19]
Aoki et al.

[11] Patent Number: 5,754,896
[45] Date of Patent: May 19, 1998

[54] LENS DEVICE HAVING A FOCUSING LENS UNIT COUPLED TO A DRIVE RING BY A COUPLING MEMBER AND HAVING A NOTCH TO PREVENT THE COUPLING MEMBER FROM OBSTRUCTING INSERTION OF THE FOCUSING LENS UNIT INTO THE LENS DEVICE

[75] Inventors: Hitoshi Aoki, Tokyo; Minoru Kato, Kawasaki, both of Japan

[73] Assignee: Nikon Corporation, Tokyo, Japan

[21] Appl. No.: 791,779

[22] Filed: Jan. 29, 1997

Related U.S. Application Data

[63] Continuation-in-part of Ser. No. 646,534, May 8, 1996.

[30] Foreign Application Priority Data

May 9, 1995 [JP] Japan ................................. 7-110895

[51] Int. Cl.$^6$ ........................................................ G03B 3/00
[52] U.S. Cl. ................................................ 396/144; 396/451
[58] Field of Search ........................ 396/144, 79, 80, 396/83, 533, 531, 529, 451, 462, 89, 505; 359/823, 825

[56] References Cited

U.S. PATENT DOCUMENTS 5,033,819  7/1991  Tanaka ................................. 359/823
5,461,443  10/1995  Nakayama et al. ................. 359/823 X
5,587,754  12/1996  Katayama et al. .................... 396/144

*Primary Examiner*—W. B. Perkey

[57] ABSTRACT

A lens device having a base unit, a lens unit and an intermediate member. The base unit includes a drive ring which is rotatable around an optical axis of the lens device and has a coupling portion which protrudes into the housing space. The lens unit is inserted into a housing space of the base unit. Moreover, the lens unit is rotatable around the optical axis of the lens device and rotatably coupled to the base unit so that the rotation of the lens unit around the optical axis of the lens device causes the lens unit to move along the optical axis. The intermediate member is connected to the lens unit and has a groove. The coupling portion of the drive ring is engaged in the groove so that the rotation of the drive ring causes the coupling portion to interact with the groove to move the intermediate member. The movement of the intermediate member causes the lens unit to rotate around, and thereby move along, the optical axis in accordance with the rotation of the drive ring. The lens unit includes a notch so that, when the lens unit is inserted into the housing space of the base unit, the coupling portion of the drive unit passes through the notch and engages with the groove of the intermediate member, thereby allowing the lens unit to be inserted into the housing space of the base unit without being obstructed by the coupling portion.

26 Claims, 11 Drawing Sheets

LENS DEVICE HAVING A FOCUSING LENS UNIT COUPLED TO A DRIVE RING BY A COUPLING MEMBER AND HAVING A NOTCH TO PREVENT THE COUPLING MEMBER FROM OBSTRUCTING INSERTION OF THE FOCUSING LENS UNIT INTO THE LENS DEVICE

CROSS-REFERENCE TO RELATED APPLICATIONS

This application is a continuation-in-part, and claims the benefit under 35 USC 120 of, U.S. patent application Ser. No. 08/646,534, filed May 8, 1996, and which is incorporated herein by reference.

Moreover, this application is based on, and claims priority to, Japanese patent applications 08-012914 and 07-110895, filed Jan. 29, 1996, and May 9, 1995, respectively, in Japan, and which are incorporated herein by reference.

BACKGROUND OF THE INVENTION

1. Field of the Invention

The present invention relates to a lens device having a rotatable drive ring for moving a focusing lens unit along the optical axis of the lens device, wherein a coupling member couples the drive ring to the focusing lens unit. More particularly, the present invention relates to a focusing lens unit having a notch to allow the focusing lens unit to be inserted into the lens device without being obstructed by the coupling member.

2. Description of the Related Art

Conventionally, a lens device of a camera can have a shutter unit with a focusing lens unit arranged therein. The focusing lens unit is maintained within the shutter unit, but moves in the optical axis direction of the lens device.

Such a conventional lens device is illustrated in FIGS. 1 and 2. Referring now to FIGS. 1 and 2, a focusing lens unit 3 includes a focusing lens 3c. Focusing lens unit 3 is inserted into a shutter unit 4. A male helicoid 3e formed on focusing lens unit 3 is screwed into a female helicoid 4d formed in shutter unit 4. A drive ring (not illustrated) is formed in shutter unit 3. An actuator (not illustrated) is positioned in shutter unit 4 and causes the drive ring to rotate around the optical axis of the lens device. A lever portion 4c of the drive ring is coupled to coupling projections 3d of focusing lens unit 3. When the drive ring is rotated by the actuator, the interaction of coupling projections 3d with lever portion 4c causes focusing lens unit 3 to rotate. As a result, male helicoid 3e and female helicoid 4d cause focusing lens unit 3 to move in the optical axis direction while rotating around the optical axis, thereby focusing the lens device.

As illustrated in FIG. 2, focusing lens unit 3 is located in a front portion 60 of shutter unit 4, and rotates around the optical axis via lever portion 4c. Shutter sectors (not illustrate) are positioned in a rear portion 62 of shutter unit 4. The shutter sectors are capable of opening and closing, to act as a shutter and a stop. As can be seen from FIGS. 1 and 2, lever portion 4c is not coupled to coupling projections 3d over the entire range of motion of focusing lens unit 3 along the optical axis direction. In other words, focusing lens unit 3 can still move in the optical axis direction after extending far enough to decouple lever portion 4c from coupling projections 3d.

Moreover, a conventional lens device, as in FIGS. 1 and 2, uses only focusing lens 3c as the photographic optical system. However, high magnification lens devices use a more complicated lens structure requiring several different lenses. For example, a high magnification lens device may include a fixed lens located in front of focusing lens 3c. Further, to maintain a relatively small size on the lens device, such a high magnification lens device would position focusing lens unit 3 further back within shutter unit 4 towards rear portion 62. Thus, focusing lens unit 3 would be positioned closer to the shutter sectors (not illustrated).

Unfortunately, with focusing lens unit 3 positioned further back within shutter unit 4, the extension of lever portion 4c in the optical axis direction is limited. More specifically, even by extending lever portion 4c as far as possible, the limited extension of lever portion 4c will prevent lever portion 4c from being coupled to coupling projections 3d for the entire range of motion of focusing lens unit 3 in the optical axis direction. As a result, lever portion 4c can become "decoupled" from coupling projections 3d, thereby making it impossible to drive focusing lens 3 via lever portion 4c. Moreover, even if lever portion 4c remains coupled to coupling projections 3d for the maximum extent allowable by the length of lever portion 4c, the limited length of lever portion 4c will prevent lever portion 4c from driving focusing lens unit 3 along the entire range of motion of focusing lens unit 3 in the optical axis direction. As a result, lever portion 4c cannot effectively be used with a photographic lens device having a fixed lens located in front of focusing lens 3c.

Further, during an assembly process for assembling a lens device, it is often difficult to insert a focusing lens unit into a shutter unit, since components within the shutter unit may protrude into the space to be occupied by the focusing lens unit, and thereby obstruct the insertion of the focusing lens unit.

SUMMARY OF THE INVENTION

Accordingly, it is an object of the present invention to provide a lens device which drives a focusing lens unit to a desired position and has a small, compact size.

It is a further object of the present invention to provide a lens device having a coupling member which rotates integrally with a drive ring and guides the motion of a focusing lens along the optical axis of the lens device.

It is an additional object of the present invention to provide a lens device having a focusing lens unit with a notch so that the focusing lens unit can be inserted into a shutter unit without being obstructed by components within the shutter unit, and especially without being obstructed by a coupling device used to couple the movement of the focusing lens unit to the movement of a drive ring.

The foregoing objects of the present invention are achieved by providing a lens device, which includes a base unit, a lens unit, a lens moving mechanism and an intermediate member. The base unit has a housing space therein. The lens unit is inserted into the housing space of the base unit and is movable relative to the base unit. The lens moving mechanism protrudes into, and is movable inside, the housing space. The intermediate member has a groove, and is connected to the lens unit. The lens moving mechanism is engaged in the groove so that the movement of the lens moving mechanism causes the lens moving mechanism to interact with the groove to move the intermediate member. The movement of the intermediate member causes the lens unit to move relative to the base unit. The lens unit includes a notch so that, when the lens unit is inserted into the housing space of the base unit, the lens moving mechanism passes through the notch and engages with the groove of the intermediate member. Thus, the notch allows the lens unit to be inserted into the housing space of the base unit without being obstructed by the lens moving mechanism.

Objects of the present invention are also achieved by providing a lens device having a base unit, a lens unit and an intermediate member. The base unit has a housing space therein. Moreover, the base unit includes a drive ring which is rotatable around the optical axis of the lens device and has a coupling portion which protrudes into the housing space. The lens unit is inserted into the housing space of the base unit. Further, the lens unit is rotatable around the optical axis of the lens device and rotatably coupled to the base unit so that the rotation of the lens unit around the optical axis of the lens device causes the lens unit to move along the optical axis of the lens device, relative to the base unit. The intermediate member is connected to the lens unit and has a groove. The coupling portion of the drive ring is engaged in the groove so that the rotation of the drive ring causes the coupling portion to interact with the groove to move the intermediate member. The movement of the intermediate member causes the lens unit to rotate around, and thereby move along, the optical axis in accordance with the rotation of the drive ring. The lens unit includes a notch so that, when the lens unit is inserted into the housing space of the base unit, the coupling portion of the drive unit passes through the notch and engages with the groove of the intermediate member. Thus, the notch allows the lens unit to be inserted into the housing space of the base unit without being obstructed by the coupling portion.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
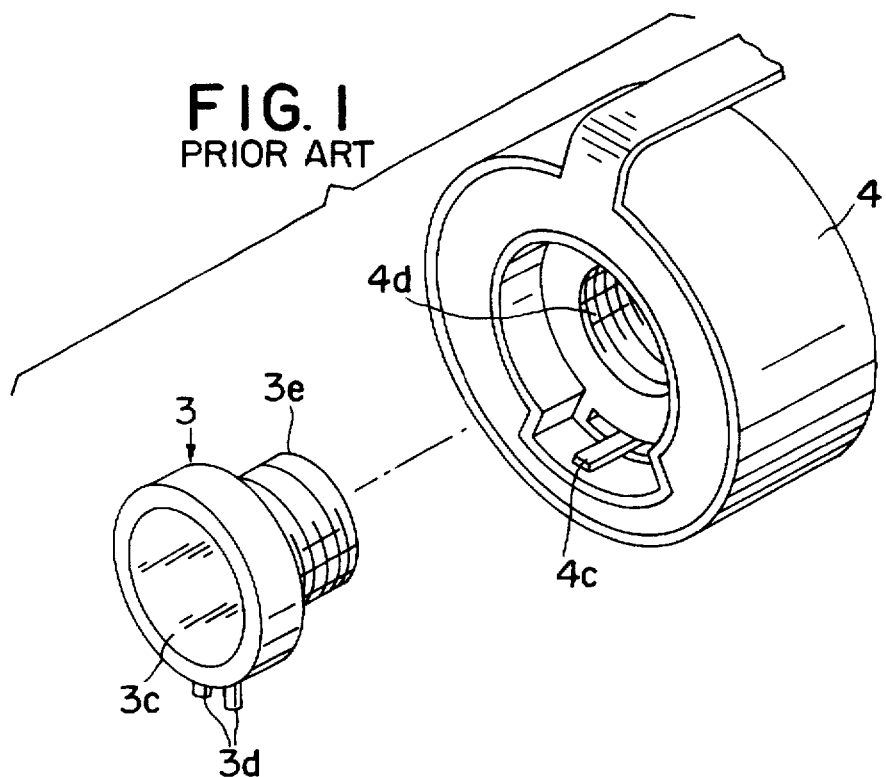
FIG. 1 (prior art) is a diagram illustrating an exploded, oblique view of a conventional lens device.
Figure 2:
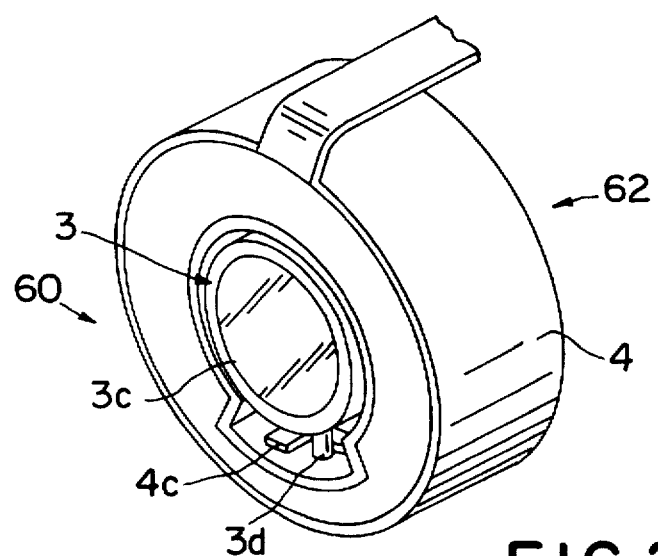
FIG. 2 (prior art) is a diagram illustrating an oblique view of the lens device illustrated in FIG. 1.

Reference will now be made in detail to the present preferred embodiments of the present invention, examples of which are illustrated in the accompanying drawings, wherein like reference numerals refer to like elements throughout.

Figure 3:
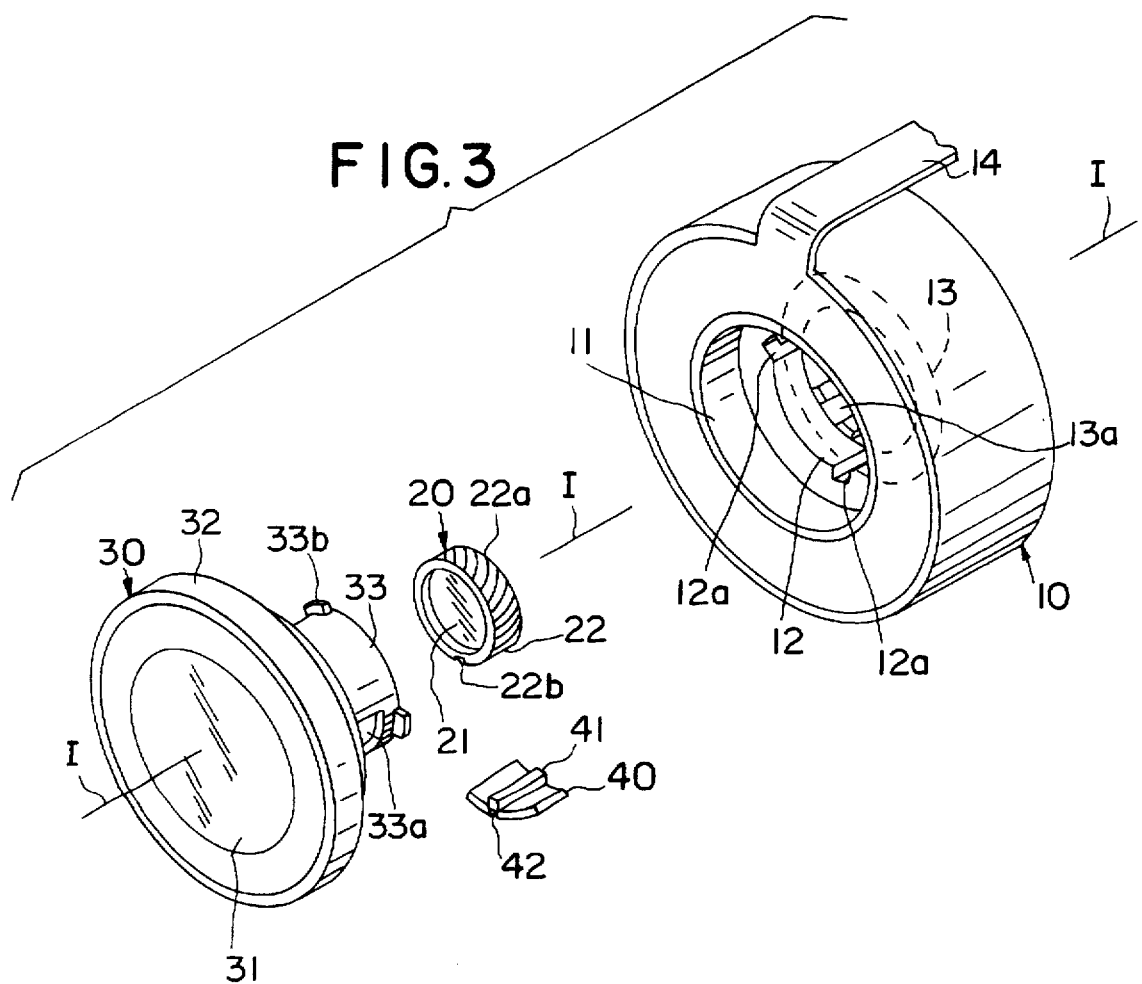
FIG. 3 is a diagram illustrating an exploded, oblique view of a photographic lens device of a camera, according to an embodiment of the present invention.

FIG. 3 is a diagram illustrating an exploded, oblique view of a photographic lens device of a camera, according to an embodiment of the present invention. Referring now to FIG. 3, the photographic lens device includes a shutter unit 10, a focusing lens unit 20, a fixed (stationary) lens unit 30 and an intermediate member 40. A lens accommodation space formed by a large diameter part 11 and a small diameter part 12 is arranged in shutter unit 10. Plural grooves 12a are formed in an axial direction in the inner circumferential surface of small diameter part 12, and fixed lens unit 30 is mounted to shutter unit 10 via grooves 12a. A drive ring 13, made of metal, is supported in the interior of shutter unit 10 and covers small diameter part 12. Drive ring 13 is rotatable around the optical axis I, but cannot move in the optical axis direction. A coupling portion 13a protrudes in the inner circumferential portion of drive ring 13 within small diameter part 12.

Shutter sectors SC (see FIG. 6) are positioned inside shutter unit 10 and are used as a diaphragm. A shutter sector drive mechanism (not illustrated) for driving shutter sectors SC and a focusing drive mechanism (not illustrated) for driving focusing lens unit 20 are also positioned inside shutter unit 10. A flexible printed circuit board 14 connects shutter sector drive mechanism and focusing drive mechanism to a control circuit (not illustrated) in the body (not illustrated) of the camera.

Focusing lens unit 20 includes a focusing lens 21 and a holder 22 which supports focusing lens 21. A male helicoid 22a and a groove 22b are formed in the outer circumferential surface of holder 22. Groove 22b extends in the optical axis direction of the photographic lens device.

Fixed lens unit 30 includes a fixed lens 31, a holder 32 which supports fixed lens 31, and a tubular projecting portion 33 projecting in the rear portion of holder 32. A groove 33a is formed in the circumferential surface of tubular projecting portion 33, over a predetermined angular extent. Bayonet catches 33b are formed in the outer circumferential surface rear end portion of projecting portion 33, and are positioned to correspond with grooves 12a of shutter unit 10. A female helicoid 33c (see FIG. 6) is formed in the inner circumferential surface of projecting portion 33, and is in threaded engagement with male helicoid 22a of focusing lens unit 20.

Intermediate member 40 has an approximately circular arcuate form and is inserted into groove 33a of fixed lens unit 30. Intermediate member 40 is rotatable in the optical axis direction within groove 33a, guided by the front and rear wall surfaces of groove 33a. A projecting rib 41 extends in the optical axis direction inside the circular arcuate surface of intermediate member 40, and is engaged with groove 22b of focusing lens unit 20. In addition, a groove 42 is formed in the outside circular arcuate surface of intermediate member 40, and extends in the optical axis direction. Groove 42 is engaged with coupling portion 13a of drive ring 13.

Figure 4:
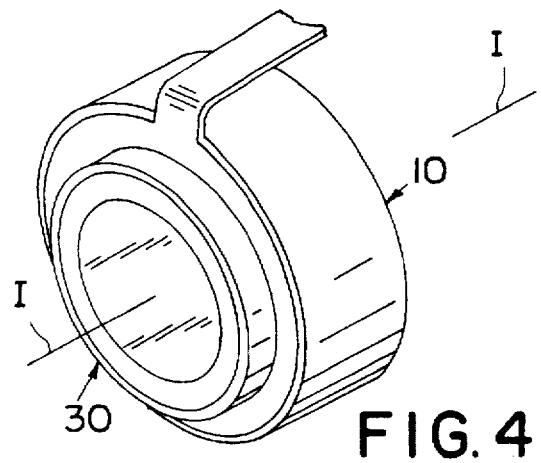
FIG. 4 is a diagram illustrating an oblique view of the photographic lens device illustrated in FIG. 3, according to an embodiment of the present invention.
Figure 5:
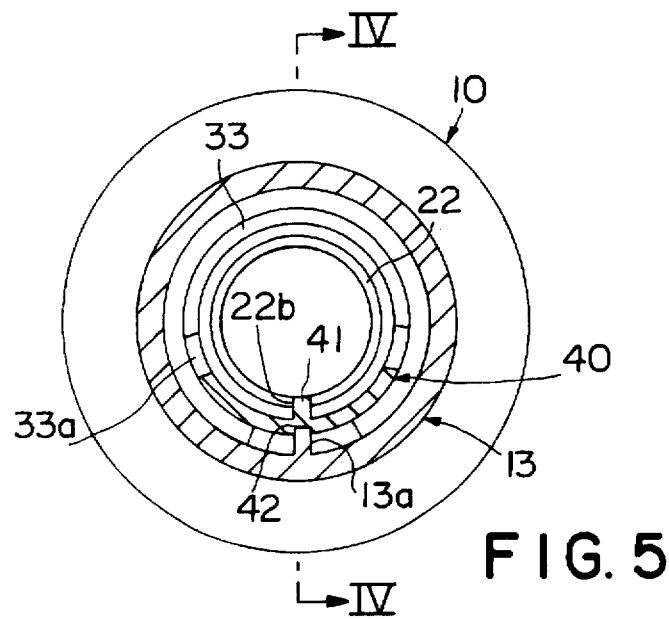
FIG. 5 is a diagram illustrating a cross section in a plane perpendicular to the optical axis of the photographic lens device illustrated in FIG. 4, according to an embodiment of the present invention.
Figure 6:
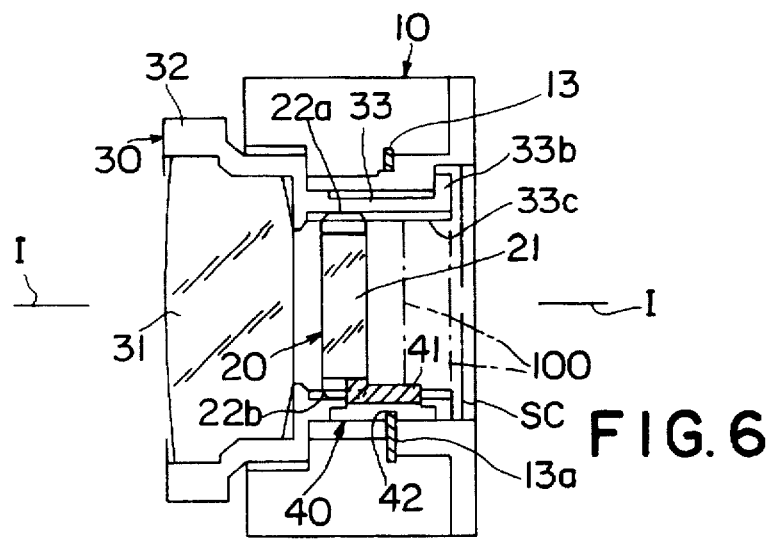
FIG. 6 is a diagram illustrating a cross section along the line IV—IV of FIG. 5, according to an embodiment of the present invention.

FIGS. 4–6 are diagrams illustrating the interaction of the various components of the photographic lens device illustrated in FIG. 3, according to an embodiment of the present invention. More specifically, FIG. 4 is a diagram illustrating an oblique view of the photographic lens device illustrated in FIG. 3, according to an embodiment of the present invention. FIG. 5 is a diagram illustrating a cross section in a plane perpendicular to the optical axis I of the photographic lens device illustrated in FIG. 4, according to an embodiment of the present invention. FIG. 6 is a diagram illustrating a cross section along the line IV—IV of FIG. 5, according to an embodiment of the present invention.

Referring now to FIGS. 4–6, focusing lens unit 20 is inserted into projecting portion 33 of fixed lens unit 30, with male helicoid 22a in threaded engagement with female helicoid 33c. Intermediate portion 40 is inserted into groove 33a of projecting portion 33. Projecting rib 41 of intermediate portion 40 then couples with groove 22b of focusing lens unit 20. Fixed lens unit 30 is assembled within shutter unit 10 so that bayonet catches 33b are inserted into grooves 12a and fixed in a bayonet manner. Coupling portion 13a of drive ring 13 is coupled with groove 42 of intermediate member 40. In such an assembled state, focusing lens 21 and fixed lens 31 are coaxially supported by drive ring 13.

A drive mechanism (not illustrated) is positioned inside shutter unit 10 and is used to rotate drive ring 13 around the optical axis I of the photographic lens device. When drive ring 13 is rotated around the optical axis I, the coupling of coupling portion 13a with groove 42 causes intermediate member 40 to rotate integrally with drive ring 13. During this rotation of intermediate member 40 with drive ring 13, intermediate member 40 moves along groove 33a of projecting portion 33 of fixed lens unit 30.

As described above, drive ring 13 rotates around the optical axis I. However, drive ring 13 and intermediate member 40 are both prevented from moving in the optical axis direction. Further, during the rotation of drive ring 13 around the optical axis I and since drive ring 13 and intermediate member 40 are prevented from moving in the optical axis direction, the coupling of projecting rib 41 with groove 22b causes focusing lens unit 20 to rotate around the optical axis I. Also, the interaction of male helicoid 22a and female helicoid 33c causes focusing lens unit 20 to move in the optical axis direction, to thereby perform focusing of the photographic lens device. Therefore, focusing lens unit 20 rotates around the optical axis I and, at the same time, moves along in the optical axis direction.

In FIG. 6, focusing lens unit 20 is illustrated as being in a first position. Focusing lens unit 20 is capable of movement along the optical axis direction between the first position and a second position indicated by chain-dot lines 100 in FIG. 6. The range of movement of focusing lens unit 20 is governed by the angular rotation range of intermediate member 40. More specifically, the range of movement of focusing lens 20 is governed by the length in the circumferential direction of groove 33a of fixed lens unit 30.

The length of projecting rib 41 of intermediate member 40 is fixed so that projecting rib 41 is engaged in groove 22b along the entire range of movement of focusing lens unit 20. As a result, focusing lens unit 20 will not detach from intermediate member 40, regardless of the position of focusing lens unit 20 along the optical axis direction. Therefore, the rotation of drive ring 13 is reliably transmitted to focusing lens unit 20.

In the present embodiment of the present invention, focusing lens unit 20 can be made smaller in size (or lighter in weight) as compared to a focusing lens unit in a conventional photographic lens device. As a result, the load of a lens drive mechanism for driving the focusing lens can be reduced, thereby reducing the size of the shutter unit (into which the lens drive mechanism is positioned). In addition, as previously described, fixed lens unit 30 is mounted to shutter unit 10 via a bayonet method. Therefore, the initial position setting of fixed lens 31 in the optical axis direction can be easily performed at the time of assembly.

According to the above embodiments of the present invention, male helicoid 22a and female helicoid 33c function as a movement mechanism which rotates to cause focusing lens unit 20 to move in the optical axis direction. Also, projecting rib 41 of intermediate member 40 functions as a rotary coupling member which guides focusing lens unit 20 in the optical axis direction while focusing lens unit 20 is rotating around the optical axis I with drive ring 13.

Figure 7:
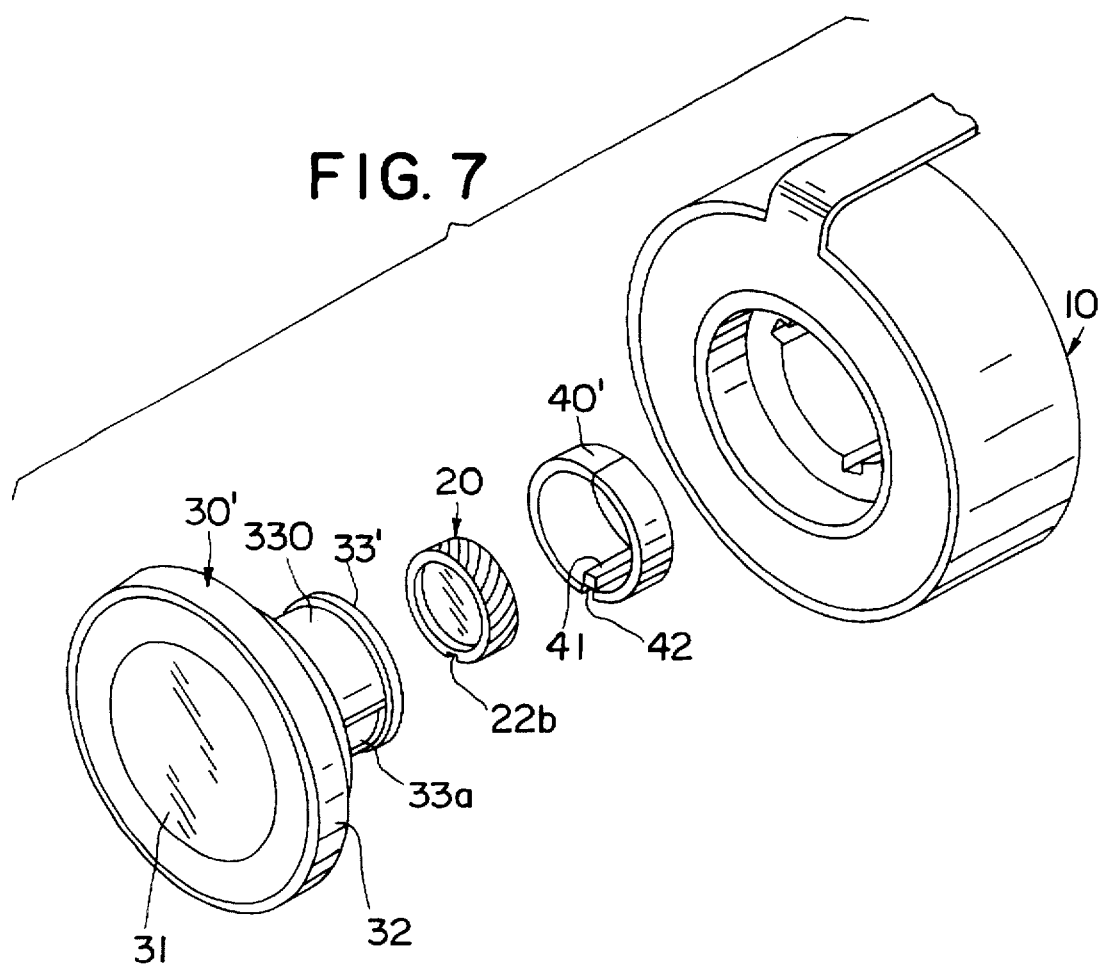
FIG. 7 is a diagram illustrating an exploded, oblique view of a photographic lens device according to an embodiment of the present invention.

FIG. 7 is a diagram illustrating an exploded, oblique view of a photographic lens device according to an additional embodiment of the present invention. Whereas FIGS. 3–6 illustrate embodiments of the present invention in which intermediate member 40 has a circular arcuate form, FIG. 7 illustrates an embodiment of the present invention in which an intermediate member 40' has a tubular, or cylindrical, shape. As illustrated in FIG. 7, a groove 330 is arranged in the outer circumferential surface of a projecting portion 33' of a fixed lens unit 30'. Intermediate member 40' is inserted into groove 330. Projecting rib 41, engaged in groove 22b of focusing lens unit 20, may be made to project from groove 33a into the interior of projecting portion 33'.

Figure 8:
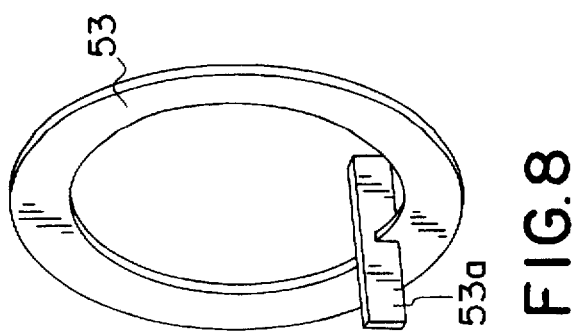
FIG. 8 is a diagram illustrating an oblique view of a rib disposed in a drive ring of a lens device, according to an embodiment of the present invention.

FIG. 8 is a diagram illustrating an oblique view of a rib disposed in a drive ring of a lens device, according to an embodiment of the present invention. Whereas FIGS. 3–6 illustrate embodiments of the present invention in which drive ring 13 and intermediate member 40 are separate components, FIG. 8 illustrates an embodiment of the present invention in which a projecting rib 53a (fulfilling the same function as projecting rib 41 in FIGS. 3–6) is integrally formed with a drive ring 53 (which fulfills the same function as drive ring 13).

Figure 9:
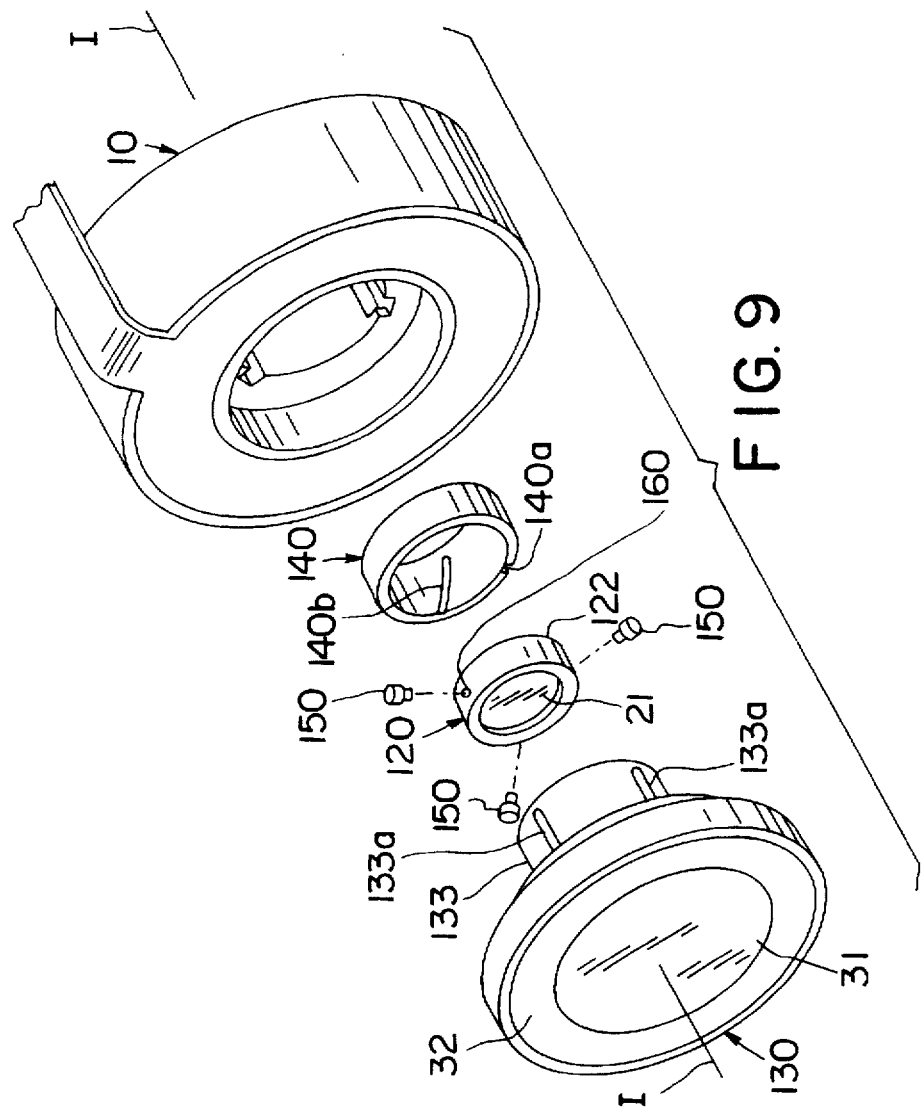
FIG. 9 is a diagram illustrating an exploded, oblique view of a photographic lens device according to an embodiment of the present invention.

FIG. 9 is a diagram illustrating an exploded, oblique view of a photographic lens device according to a further embodiment of the present invention. Whereas FIGS. 3–8 illustrate embodiments of the present invention in which helicoids (such as male helicoid 22a and female helicoid 33c) cause a focusing lens unit to move in the optical axis direction, FIG. 9 illustrates an embodiment of the present invention in which a focusing lens unit moves in the optical axis direction via a cam mechanism which functions as a cylindrical shaped intermediate member.

Referring now to FIG. 9, a focusing lens unit 21 includes a focusing lens 21 and a holder 122. Cam followers 150 are respectively set into holes 160 formed in the outer circumferential surface of holder 122. A fixed lens unit 130 includes a fixed lens 21, a holder 32 and a projecting portion 133 which projects from the rear potion of holder 32. Straight grooves 133a are formed in the outer surface of projecting portion 133, in the optical axis direction. Straight grooves 133a correspond, respectively, to cam followers 150.

A cam tube 140 has a coupling groove 140a formed in its outer circumferential surface, in the optical axis direction. Coupling groove 140a engages with coupling portion 13a of drive ring 13. Cam tube 140 also has cam grooves 140b formed in its inner circumferential surface. Cam grooves 140b correspond, respectively, to cam followers 150.

Focusing lens unit 120, having cam followers 150 set therein, is inserted into projecting portion 133 of fixed lens unit 130. Cam tube 140 is arranged on the outside of the inserted projecting portion 133. Each Cam follower 150 penetrates through the corresponding straight groove 133a of projecting portion 133, to engage with the corresponding cam groove 140b of cam tube 140. Projecting portion 133 of fixed lens unit 130 is inserted into shutter unit 10.

The rotation of drive ring 13 causes cam tube 140 to rotate via coupling portion 13a (see FIG. 3). In addition, cam followers 150 move in the optical axis direction along straight grooves 133a of fixed lens unit 130 via the movement of cam grooves 140b. As a result, focusing lens unit moves in the optical axis direction without rotating, to thereby focus the photographic lens device.

Cam followers 150 are engaged with cam grooves 140b and straight grooves 133a over the entire range of movement of focusing lens unit 120. Therefore, focusing lens unit 120 does not separate from cam tube 140 and fixed lens unit 130, regardless of the position of focusing lens unit 130. As a result, the rotation of drive ring 13 is reliably transmitted to focusing lens unit 120.

According to the embodiment of the present invention as illustrated in FIG. 9, cam tube 140 functions as a rotary body which rotates integrally with a drive ring (such as drive ring 13 illustrated in FIG. 3), and cam followers 150 function as a coupling portion to couple focusing lens unit 120 to the rotary body over the entire range of movement of focusing lens unit 120.

According to the embodiment of the present invention as illustrated in FIG. 9, cam grooves 140b are formed in cam tube 140, and straight grooves 113a are formed in fixed lens unit 130. Instead, cam grooves may be formed in fixed lens unit 130, and straight grooves may be formed in cam tube 140. In this case, focusing lens unit 120 would move in the optical axis direction while rotating around the optical axis I.

According to the above embodiments of the present invention, a rotary coupling member couples a focusing lens unit over the entire range of movement of the focusing lens unit in the optical axis direction. The rotary coupling member transmits the rotation of a drive ring to the focusing lens unit, and causes the focusing lens unit to rotate. Therefore, a focusing lens within the focusing lens unit can be reliably driven to a desired position, even over a large range of movement of the focusing lens unit.

According to the above embodiments of the present invention, the rotary coupling member can be formed in the drive ring. Therefore, it is not necessary to interpose an intermediate member between the drive ring and the rotary coupling member. As a result, the number of required components is reduced.

Moreover, according to the above embodiments of the present invention, the photographic lens device can use a fixed lens unit having a fixed lens thereon. However, the use of a fixed lens unit will increase the size of the photographic lens device. If a portion of the fixed lens unit is inserted and fixed within a shutter unit, any increase in size of the photographic lens device can be minimized.

According to the above embodiments of the present invention, a rotary coupling member can be formed in an intermediate member which rotates with the rotation of the drive ring. For example, see projecting rib 41 of intermediate member 40 in FIG. 3. Such a rotary coupling member can be formed to rotate around the optical axis in a groove of arcuate shape arranged in the fixed lens unit. As a result, any increase in size of the photographic lens device resulting from the use of a fixed lens unit can be minimized.

According to the above embodiments of the present invention as illustrated in FIG. 3-6, shutter unit 10 has drive ring 13 built-in for use in focusing. Drive ring 13 is rotationally driven around a rotation axis and is prevented from moving in the direction of the rotation axis. Focusing lens unit 20 is rotatably inserted within shutter unit 10, with the rotation axis of the focusing lens unit 20 coinciding with the optical axis I of the photographic lens device. A movement mechanism (such as male helicoid 22a, female helicoid 33c) rotates to cause focusing lens unit 20 to move in the optical axis direction. By rotating with drive ring 13, a rotary coupling member (such as projecting rib 41) guides focusing lens unit 20 in the optical axis direction while causing focusing lens unit 20 to rotate around the optical axis. The rotary coupling member is coupled to focusing lens unit 20 for the entire range of movement of focusing lens unit 20 in the optical axis direction. The rotary coupling member is preferably arranged in an intermediate member (such as intermediate member 40 in FIG. 3) which is integrally and rotatably coupled to drive ring 13.

Further the intermediate member (such as intermediate member 40 in FIG. 3) preferably has an outer circular arcuate surface and an inner circular arcuate surface, with the optical axis I of the focusing lens unit 20 as its center. A coupling portion (such as groove 42 in FIG. 3) is formed on the internal circular arcuate surface of the intermediate member, and coupled to a different coupling portion (such as coupling portion 13a in FIG. 3) formed on the inner circumference of drive ring 13. In addition, the rotary coupling member (such as projecting rib 41) is preferably formed on the inner circular arcuate surface of the intermediate member.

According to the above embodiments of the present invention as illustrated in FIG. 7, an intermediate member (such as intermediate member 40') can be cylindrical shaped, with a coupling portion (such as groove 42) formed on its outer peripheral surface. The coupling portion (such as groove 42) is coupled to a coupling portion formed on the inner circumferential portion of drive ring 13. A rotary coupling member (such as projecting rib 41) is formed on the inner circumferential surface of the intermediate member (such as intermediate member 41).

According to the above embodiments of the present invention, a rotary coupling member (such as projecting rib 53a) can be formed on drive ring 15.

According to the above embodiments of the present invention as illustrated in FIG. 9, rotary body 140 rotates integrally with drive ring 13. Cam follows 150 are arranged in focusing lens unit 120 and couple rotary body 140 to fixed lens unit 120 over the entire range of movement of focusing lens unit 120. Moreover, via cam followers 150, fixed lens unit 130 is coupled to fixed lens unit 120 over the entire range of movement of focusing lens unit 120. As a result, focusing lens unit 120 moves in the optical axis direction accompanying the rotation of rotary body 140.

According to the embodiments of the present invention as illustrated in FIG. 9, rotary body 140 rotates relative to fixed member 130 accompanying the rotation of drive ring 13. Cam followers 150 couple focusing lens unit 120 to rotary body 140 and fixed member 130. Via this coupling, focusing lens unit 120 is driven in the optical axis direction, and focusing is performed. Because rotary body 140 and fixed member 130 are both coupled to cam followers 150 over the entire range of movement of focusing lens unit 120, the rotation of drive ring 13 is reliably transmitted to focusing lens unit 120 regardless of the position of focusing lens unit 120.

The present invention relates to a lens device which includes a base unit (for example, shutter unit 10 in FIG. 3), a focusing lens (for example, focusing lens unit 20 or focusing lens 21 in FIG. 3) and a coupling member (for example, projecting rib 41 in FIG. 3). The base unit includes a drive ring (for example, drive ring 13 in FIG. 3) which is rotatable around the optical axis of the lens device and is prevented from moving along the optical axis of the lens device. The focusing lens is rotatable around the optical axis of the lens device and is rotatably coupled to the base unit so that the rotation of the focusing lens around the optical axis of the lens device causes the focusing lens to move along the optical axis of the lens device, relative to the base unit, while remaining coupled to the base unit. The coupling member is coupled to the focusing lens over the entire range of motion of the focusing lens along the optical axis of the lens device. The coupling member rotates integrally with the drive ring to cause the focusing lens to rotate around, and thereby move along, the optical axis in accordance with the rotation of the drive ring. The coupling member also guides the focusing lens along the optical axis as the focusing lens moves along the optical axis.

An intermediate member (for example, intermediate member 40 in FIG. 3) can be coupled to the drive ring to rotate integrally with the drive ring, wherein the coupling member is positioned on the intermediate member.

Moreover, objects of the present invention are achieved by providing an arcuate shaped intermediate member (for example, intermediate member 40 in FIG. 3) with an outer circular arcuate surface and an inner circular arcuate surface. The inner circular arcuate surface is connected to an inner circumference surface of the drive ring. The coupling member (for example, projecting rib 41) is formed on the inner circular arcuate surface of the intermediate member.

Additionally, the intermediate member (for example, intermediate member 40' in FIG. 7) can be cylindrical shaped with an inner circumferential surface and an outer circumferential surface. The outer circumferential surface is connected to an inner circumferential surface of the drive ring. The coupling member is formed on the inner circumferential surface of the intermediate member.

Figure 10:
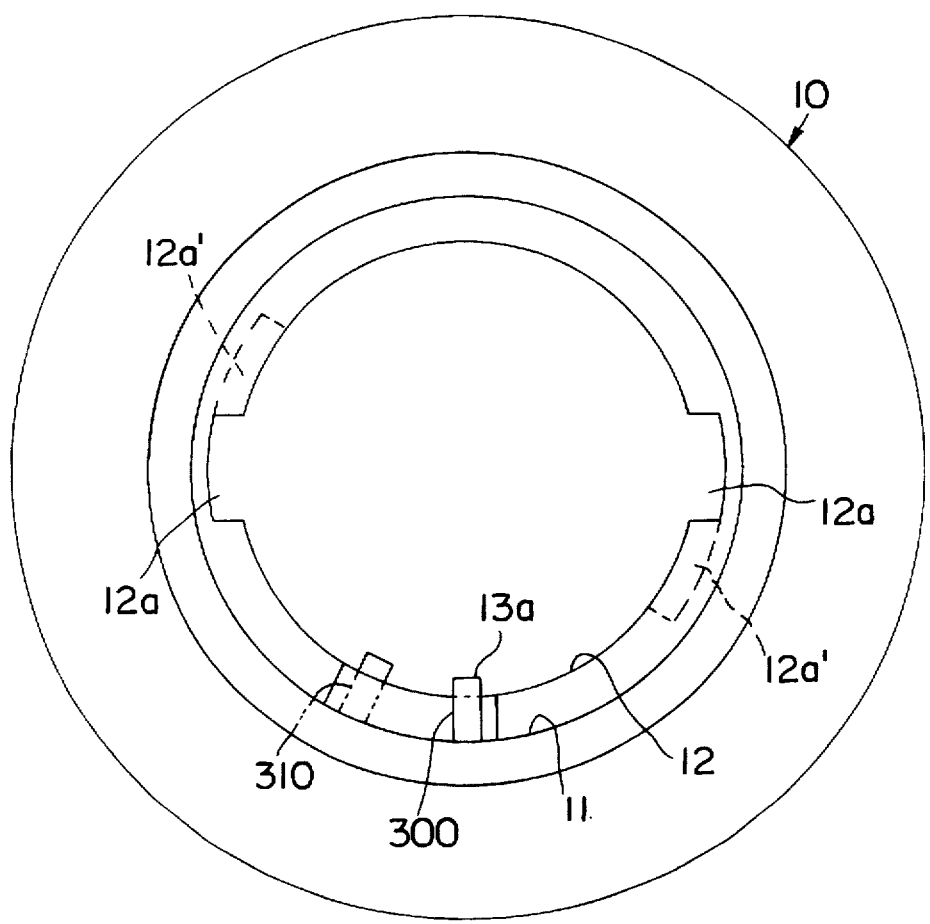
FIG. 10 is a diagram illustrating a photographic lens device, according to an embodiment of the present invention.

FIG. 10 is an additional diagram of the photographic lens device, according to an embodiment of the present invention. Referring now to FIG. 10, coupling portion 13a of drive ring 13 projects past small diameter part 12 within shutter unit 10. By rotating drive ring 13, coupling portion 13a can be moved within a range between a first position 300 to a second position 310. Thus, first position 300 and second position 310 represent the outer limits of the range of movement of coupling portion 13a. However, since coupling portion 13a projects through small diameter part 12, coupling portion 13a could block tubular projecting portion 33 from being inserted into shutter unit 10, and there is a possibility that tubular projecting portion 33 cannot be successfully inserted into shutter unit 10. This problem can be alleviated by using a notch, as illustrated in FIG. 11.

Figure 11:
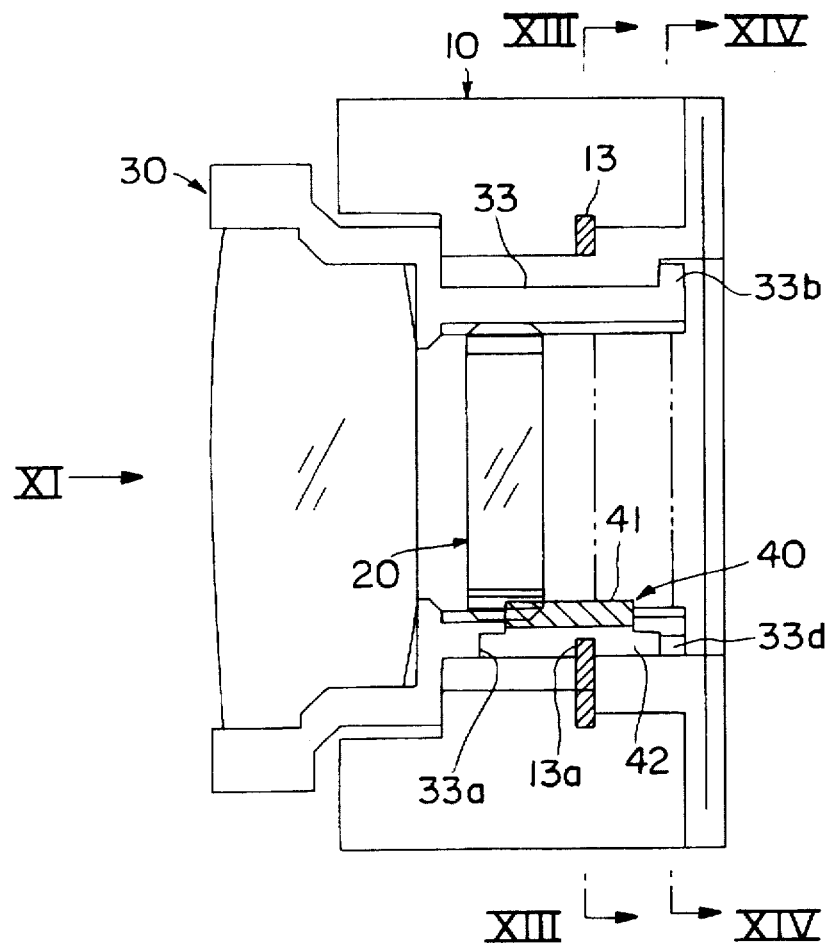
FIG. 11 is a diagram illustrating a photographic lens device, according to an additional embodiment of the present invention.

More specifically, FIG. 11 is a diagram illustrating the photographic lens device, according to an additional embodiment of the present invention, and is similar to the embodiment of the present invention illustrated in FIG. 6. The embodiment of the present invention illustrated in FIG. 11 differs from the embodiment of the present invention illustrated in FIG. 6 in that a notch 33d is disposed in tubular projecting portion 33 of fixed lens unit 30. As noted above and described in more detail below, the use of notch 33d will alleviate a problem as discussed above with reference to FIG. 10, where tubular projecting portion 33 cannot be inserted into shutter unit 10.

Figure 12:
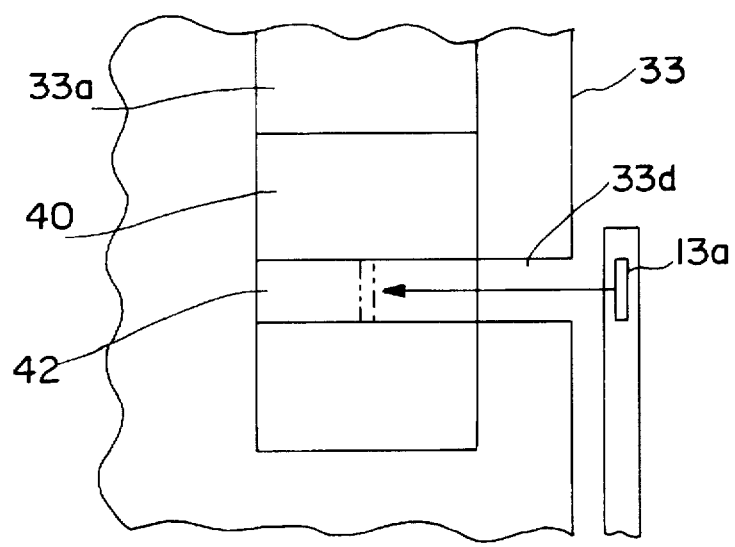
FIG. 12 is a diagram illustrating the positional relationship of various components of a photographic lens device, according to an embodiment of the present invention.

FIG. 12 is a diagram illustrating the positional relationship of various components of the photographic lens device, according to an embodiment of the present invention. Referring now to FIG. 12, intermediate member 40 is pushed all the way to one side of groove 33a. With this positioning of intermediate member 40, notch 33d is aligned with groove 42, and intermediate member 40 cannot be further moved in one direction along groove 42. As illustrated in FIG. 12, projecting portion 13a of drive ring 13 can then be moved to a position where it is aligned with notch 33d and groove 42, so that tubular projecting portion 33 can be inserted into shutter unit 10, without being hindered by coupling portion 13a projecting through small diameter part 12. This position of projecting portion 13a, where projecting portion 13a is aligned with notch 33d and groove 42, is the first position 300 illustrated in FIG. 10.

The following is a description of an assembly process for assembling the photographic lens device.

First, fixed lens unit 30, focusing lens unit 20 and intermediate member 40 are individually assembled. Then, intermediate member 40 is positioned all the way to one side of groove 33a, to align groove 33a of tubular projecting portion 33 and groove 42 of intermediate member 40 as illustrated in FIG. 12. Moreover, drive ring 13 is rotated so that projecting portion 13a is in the first position 300, as illustrated in FIG. 10. In this state, bayonet catches 33b of tubular projecting portion 33 pass along grooves 12a of shutter unit 10, to thereby determine the position of fixed lens unit 30 and allow tubular projecting portion 33 to be inserted in the housing space of shutter unit 10. During this insertion of tubular projecting portion 33, coupling portion 13a of drive ring 13 reaches groove 42 of intermediate member 40 along notch 33d of tubular projecting portion 33. As a result, the insertion of tubular projecting portion 33 is not hindered by coupling portion 13a.

Figure 13:
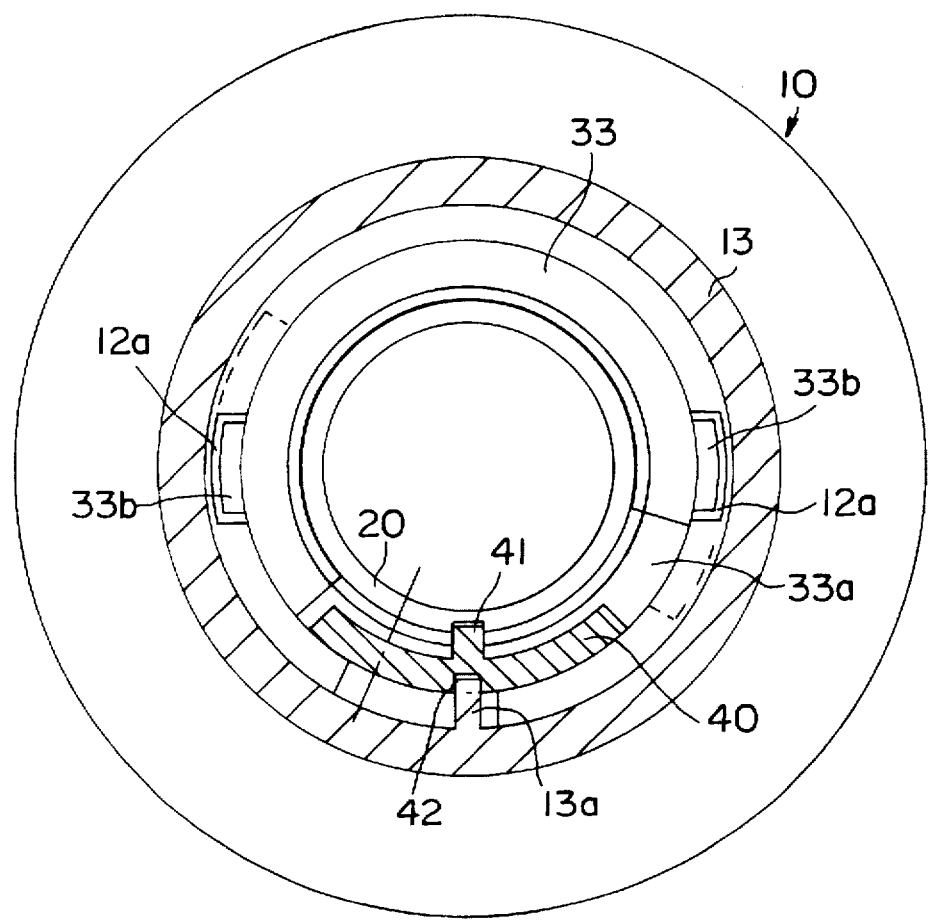
FIG. 13 is a diagram of a view from the direction XIII—XIII in FIG. 11, of a photographic lens device, according to an embodiment of the present invention and showing a state before bayonet coupling.
Figure 14:
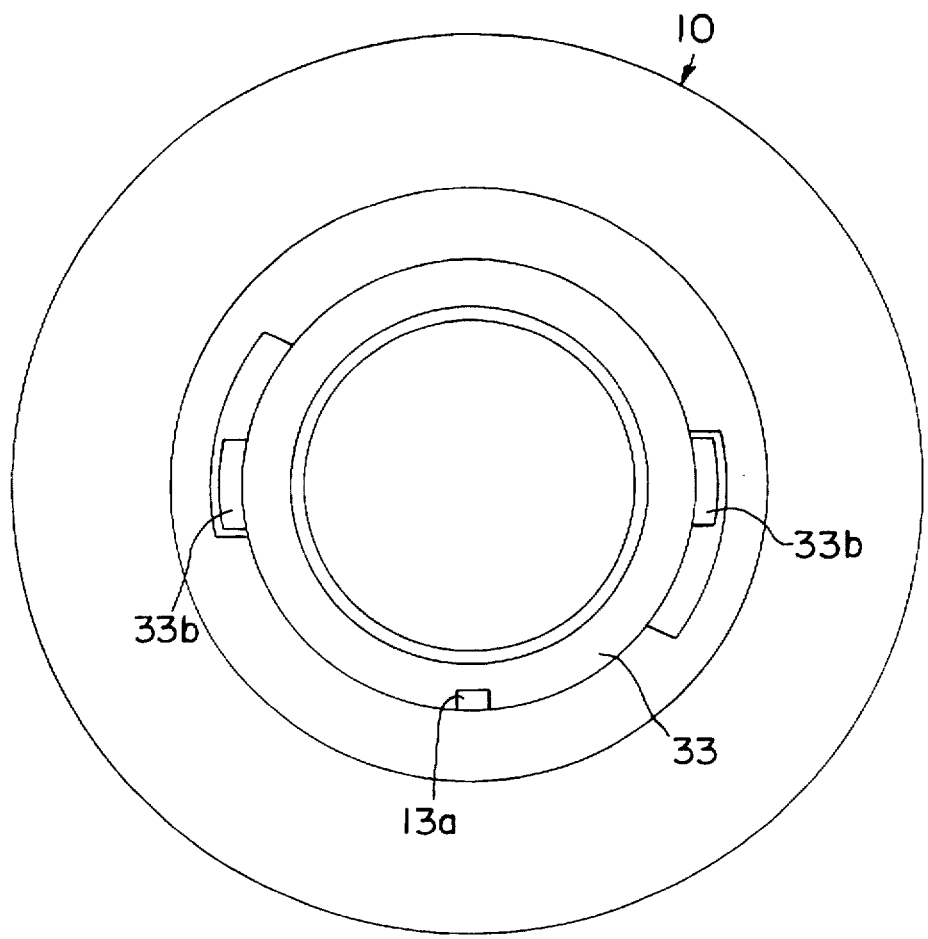
FIG. 14 is a diagram of a view from the direction XIV—XIV in FIG. 11, of a photographic lens device, according to an embodiment of the present invention and showing a state before bayonet coupling.

FIG. 13 is a diagram of a view from the direction XIII—XIII in FIG. 11, and FIG. 14 is a diagram of a view from the direction XIV—XIV in FIG. 11. FIGS. 13 and 14 both show tubular projecting portion 33 completely inserted into shutter unit 10 and before bayonet coupling. Once in this state, fixed lens unit 30 can then be rotated a predetermined amount with respect to shutter unit 10 in a clockwise direction in FIGS. 13 and 14, to thereby cause bayonet catches 33b to engage in bayonet coupling with stop portions 12a' of shutter unit 10. Therefore, bayonet catches 33b and stop portion 12a' can together be considered to be a bayonet coupling mechanism which couples fixed lens unit 30 and focusing lens unit 20 to shutter unit 10 by bayonet coupling. Moreover, many different types of catches, grooves and stop portions can be combined together to operate as such a bayonet coupling mechanism.

Figure 15:
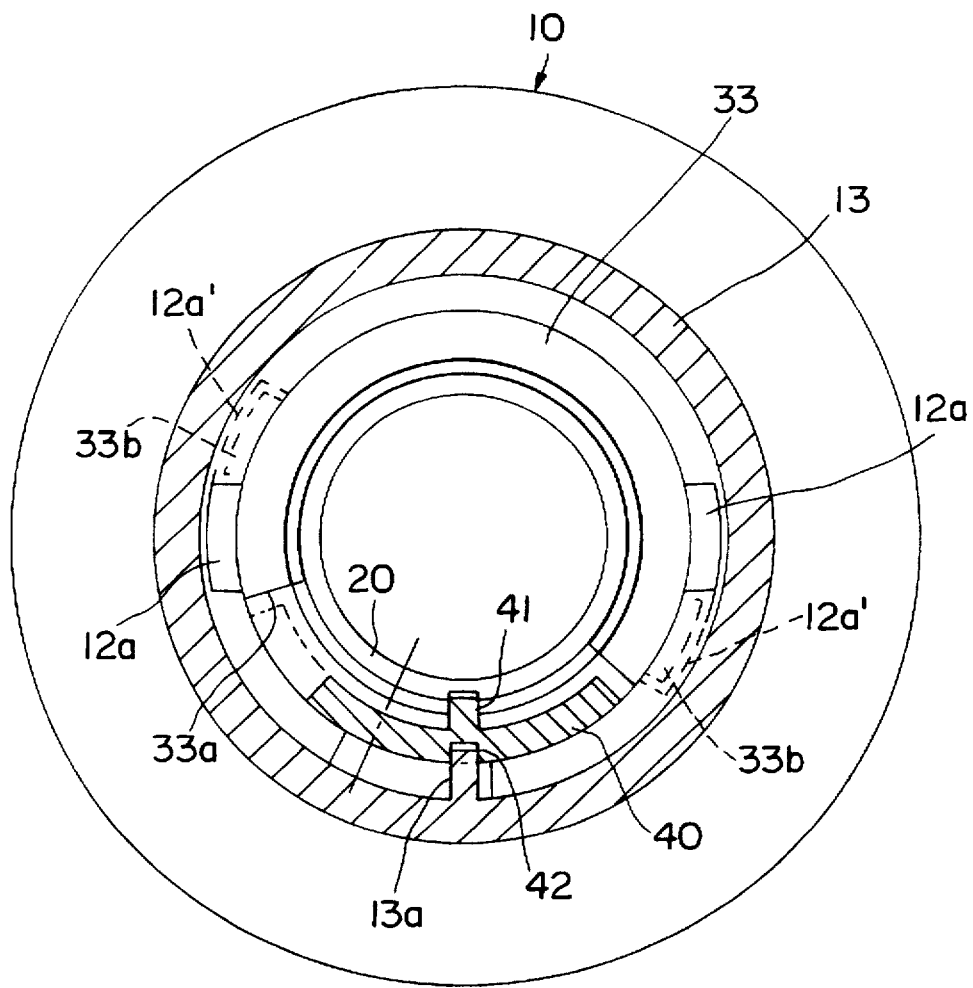
FIG. 15 is a diagram of a view from the direction XIII—XIII in FIG. 11, of a photographic lens device, according to an embodiment of the present invention and showing a state after bayonet coupling.
Figure 16:
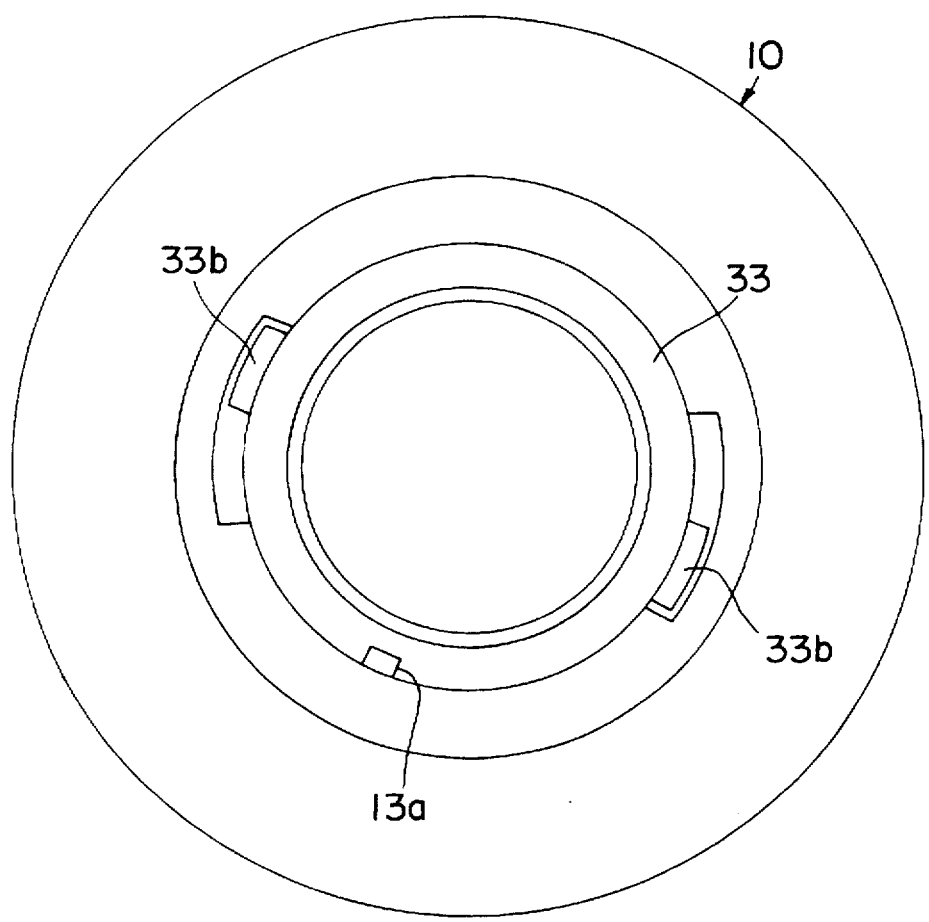
FIG. 16 is a diagram of a view taken from the direction XIV—XIV in FIG. 11, of a photographic lens device, according to an embodiment of the present invention and showing a state after bayonet coupling.

FIG. 15 is a diagram of a view from the direction XIII—XIII in FIG. 11, and FIG. 16 is a diagram of a view from the direction XIV—XIV in FIG. 11. FIGS. 15 and 16 both show tubular projecting portion 33 completely inserted into shutter unit 10 and after bayonet coupling. Thus, FIGS. 15 and 16 illustrate a state where bayonet catches 33b of tubular projecting portion 33 are engaged with bayonet system stop portions 12a' of shutter unit 10.

As described above, fixed lens unit 30 is rotated to cause bayonet catches 33b to engage in bayonet coupling. However, intermediate member 40 will not rotate integrally with fixed lens unit 30, and is limited in movement by the size of groove 33a. More specifically, intermediate member will move within groove 33a by an amount related to the amount of rotation of fixed lens unit 30. Further, the amount of rotation of fixed lens unit 30 necessary for bayonet coupling may be relatively large, but a large amount of rotation of fixed lens unit 30 can cause intermediate member 40 to move from one end of groove 33a and continue moving until intermediate member 40 collides with the other end of groove 33a. Intermediate member 40 cannot move beyond the ends of groove 33a. Therefore, bayonet coupling will be impossible if the amount of rotation required of fixed lens unit 30 is greater than that allowed by the movement of intermediate member 40 within groove 33a. Therefore, the amount of rotation of fixed lens unit 30 necessary for the bayonet coupling should be less than the amount of rotation corresponding to movement of intermediate member 40 from one end of groove 33a to the other end of groove 33a. If the required amount of rotation of fixed lens unit 30 is limited in this manner, bayonet coupling can be performed without any impediment.

More specifically, fixed lens unit 30 has a range of rotation determined by the range of movement of intermediate member 40. Thus, the rotation amount of fixed lens unit 30 required for bayonet coupling should be equal to or less than the range of rotation allowed by the range of movement of intermediate member 40.

Therefore, as illustrated by FIGS. 10–16, shutter unit 10 has an internal housing space, and drive ring 13 is rotatably supported in shutter unit 10. Projecting portion 13a of drive ring 13 projects into the housing space. Tubular projecting portion 33 of fixed lens unit 30 is inserted and fixed into the housing space of shutter unit 10. Focusing lens unit 20 is rotatably inserted, coaxially, with fixed lens 31 and within tubular projecting portion 33. Focusing lens unit 20 moves in the optical axis direction due to its rotation. Groove 42 of intermediate member 40 engages with projecting portion 13a of drive ring 13. Focusing lens unit 20 is engaged with intermediate member 40 over the entire range of movement of focusing lens unit 20 in the optical axis direction. Projecting rib 41 guides focusing lens unit 20 in the optical axis direction, while rotating around the optical axis due to the rotation of intermediate member 40 in groove 33a. In addition, notch 33d is provided in tubular projecting portion 33 of fixed lens unit 30, and guides coupling portion 13a in groove 42 of intermediate member 40 when tubular projecting portion 33 is being inserted into the housing space of shutter unit 10.

As can be seen from FIGS. 10–16, coupling portion 13a protrudes into the housing space of shutter unit 10 and interacts with groove 42 of intermediate member 40, to move focusing lens unit 20. Therefore, coupling portion 13a can be referred to as a "lens moving mechanism" which interacts with intermediate member 40 to move focusing lens unit 20. Moreover, such a "lens moving mechanism" is not intended to be limited to any particular shape or size.

Therefore, according to embodiments of the present invention as illustrated in FIGS. 10–16, a lens device has a base unit, a lens unit and an intermediate member. The base unit has a housing space therein. Moreover, the base unit includes a drive ring which is rotatable around the optical axis of the lens device and has a coupling portion which protrudes into the housing space. The lens unit is inserted into the housing space of the base unit. Further, the lens unit is rotatable around the optical axis of the lens device and rotatably coupled to the base unit so that the rotation of the lens unit around the optical axis of the lens device causes the lens unit to move along the optical axis of the lens device, relative to the base unit. The intermediate member is connected to the lens unit and has a groove. The coupling portion of the drive ring is engaged in the groove so that the rotation of the drive ring causes the coupling portion to interact with the groove to move the intermediate member. The movement of the intermediate member causes the lens unit to rotate around, and thereby move along, the optical axis in accordance with the rotation of the drive ring. The lens unit includes a notch so that, when the lens unit is inserted into the housing space of the base unit, the coupling portion of the drive unit passes through the notch and engages with the groove of the intermediate member. Thus, the notch allows the lens unit to be inserted into the housing space of the base unit without being obstructed by the coupling portion. Moreover, the notch is not intended to be limited to any particular shape or size.

According to the above embodiments, tubular insertion portion 33 is inserted into shutter unit 10. However, such an insertion portion is not intended to be limited to a "tube" shape, and can have any other appropriate shape.

The present invention is described as relating to a camera. However, the present invention is not intended to be limited to a camera. For example, the present invention can be used in devices including, but not limited to, camcorders, motion picture cameras, telescopes, binoculars, microscopes, range finding equipment, lasers, fiber optic communication systems, optical projection systems and CD mastering systems.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A lens device, comprising:
   a base unit having a housing space therein;
   a lens unit inserted into the housing space of the base unit and being movable relative to the base unit;
   a lens moving mechanism which protrudes into, and is movable inside, the housing space; and
   an intermediate member having a groove, the intermediate member connected to the lens unit with the lens moving mechanism engaged in the groove so that the movement of the lens moving mechanism causes the lens moving mechanism to interact with the groove to move the intermediate member, the movement of the intermediate member causing the lens unit to move relative to the base unit, wherein the lens unit includes a notch so that, when the lens unit is inserted into the housing space of the base unit, the lens moving mechanism passes through the notch and engages with the groove of the intermediate member.

2. A lens device as in claim 1, wherein, when the lens unit is inserted into the housing space of the base unit, the lens unit, the intermediate member and the lens moving mechanism are aligned so that the lens moving mechanism passes through the notch of the lens unit.

3. A lens device as in claim 1, the lens device having an optical axis and further comprising:

a bayonet coupling mechanism which couples the lens unit to the base unit by bayonet coupling when
the lens unit is inserted into the housing space of the base unit with the lens moving mechanism passing through the notch of the lens unit and engaging with the groove of the intermediate member, to thereby be in an insertion position, and
the lens unit is rotated from the insertion position with the optical axis as an axis of rotation.

4. A lens device as in claim 3, wherein the intermediate member has a range of movement, the lens unit has a range of rotation determined by the range of movement of the intermediate member, the lens unit is rotated from the insertion position by a rotation amount for the bayonet coupling mechanism to couple the lens unit to the base unit by bayonet coupling, and the rotation amount falls within a range of rotation allowed by the range of movement of the intermediate member.

5. A lens device as in claim 1, wherein the intermediate member is moveable within a range defined as being between a first position and a second position, and when the intermediate member is in the first position and before the lens unit is inserted into the housing space of the base unit,
the notch of the lens unit, the groove of the intermediate member and the lens moving mechanism are aligned so that, when the lens unit is inserted into the housing space of the lens unit, the lens moving mechanism passes through the notch and engages with the groove of the intermediate member.

6. A lens device having an optical axis, comprising:

a base unit having a housing space therein, the base unit including a drive ring which is rotatable around the optical axis of the lens device and has a coupling portion which protrudes into the housing space;

a lens unit inserted into the housing space of the base unit, the lens unit being rotatable around the optical axis of the lens device and rotatably coupled to the base unit so that the rotation of the lens unit around the optical axis of the lens device causes the lens unit to move along the optical axis of the lens device, relative to the base unit; and an intermediate member connected to the lens unit and having a groove, the coupling portion of the drive ring engaged in the groove so that the rotation of the drive ring causes the coupling portion to interact with the groove to move the intermediate member, the movement of the intermediate member causing the lens unit to rotate around, and thereby move along, the optical axis in accordance with the rotation of the drive ring, wherein the lens unit includes a notch so that, when the lens unit is inserted into the housing space of the base unit, the coupling portion of the drive unit passes through the notch and engages with the groove of the intermediate member.

7. A lens device as in claim 6, wherein, when the lens unit is inserted into the housing space of the base unit, the lens unit, the intermediate member and the coupling portion of the drive ring are aligned so that the coupling portion passes through the notch of the lens unit.

8. A lens device as in claim 6, further comprising:

a bayonet coupling mechanism which couples the lens unit to the base unit by bayonet coupling when
the lens unit is inserted into the housing space of the based unit with the coupling portion of the drive ring passing through the notch of the lens unit and engaging with the groove of the intermediate member, to thereby be in an insertion position, and
the lens unit is rotated from the insertion position with the optical axis as an axis of rotation.

9. A lens device as in claim 8, wherein the intermediate member has a range of movement, the lens unit has a range of rotation determined by the range of movement of the intermediate member, the lens unit is rotated from the insertion position by a rotation amount for the bayonet coupling mechanism to couple the lens unit to the base unit by bayonet coupling, and the rotation amount falls within a range of rotation allowed by the range of movement of the intermediate member.

10. A lens device as in claim 6, wherein the intermediate member is moveable within a range defined as being between a first position and a second position, and when the intermediate member is in the first position and before the lens unit is inserted into the housing space of the base unit,
the notch of the lens unit, the groove of the intermediate member and the coupling portion of the drive ring are aligned so that, when the lens unit is inserted into the housing space of the lens unit, the coupling portion passes through the notch and engages with the groove of the intermediate member.

11. A method for assembling a lens device, the lens device including, when assembled, a base unit having a housing space therein, a lens unit inserted into the housing space of the base unit and being movable relative to the base unit, a lens moving mechanism which protrudes into, and is movable inside, the housing space, and an intermediate member having a groove, the intermediate member connected to the lens unit with the lens moving mechanism engaged in the groove so that the movement of the lens moving mechanism causes the lens moving mechanism to interact with the groove to move the intermediate member, the movement of the intermediate member causing the lens unit to move relative to the base unit, wherein the lens unit includes a notch so that, when the lens unit is inserted into the housing space of the base unit, the lens moving mechanism passes through the notch and engages with the groove of the intermediate member, the method comprising the step of:

inserting the lens unit into the housing space of the base unit with the notch of the lens unit, the lens moving mechanism and the groove of the intermediate member aligned so that the lens moving mechanism passes through the notch and engages with the groove of the intermediate member.

12. A lens device having an optical axis, comprising:

a base unit including a drive ring which is rotatable around the optical axis of the lens device and is prevented from moving along the optical axis of the lens device;

a focusing lens which is rotatable around the optical axis of the lens device and is rotatably coupled to the base unit so that the rotation of the focusing lens around the optical axis of the lens device causes the focusing lens to move along the optical axis of the lens device, relative to the base unit, while remaining coupled to the base unit; and a coupling member, coupled to the focusing lens over the entire range of motion of the focusing lens along the optical axis of the lens device, rotating integrally with the drive ring to cause the focusing lens to rotate around, and thereby move along, the optical axis in accordance with the rotation of the drive ring, and guiding the focusing lens along the optical axis as the focusing lens moves along the optical axis.

13. A lens device as in claim 12, further comprising:

an intermediate member coupled to the drive ring to rotate integrally with the drive ring, wherein the coupling member is positioned on the intermediate member.

14. A lens device as in claim 13, wherein:

the intermediate member is arcuate shaped with an outer circular arcuate surface and an inner circular arcuate surface, the inner circular arcuate surface of the intermediate member being connected to an inner circumference surface of the drive ring, and the coupling member is formed on the inner circular arcuate surface of the intermediate member.

15. A lens device as in claim 13, wherein the intermediate member is cylindrical shaped with an inner circumferential surface and an outer circumferential surface, the outer circumferential surface of the intermediate member is connected to an inner circumferential surface of the drive ring, and the coupling member is formed on the inner circumferential surface of the intermediate member.

16. A lens device as in claim 12, wherein the coupling member is formed on the drive ring.

17. A lens device as in claim 12, further comprising:

a lens unit which holds a stationary lens and has a projecting portion which holds the focusing lens, wherein the projecting portion, holding the focusing lens, extends inside the base member.

18. A lens device as in claim 17, further comprising:

a first helicoid formed on an outer circumferential surface of the focusing lens; and a second helicoid formed on an inner circumferential surface of the base unit, the first helicoid and the second helicoid cooperating together for rotatably coupling the focusing lens to the base unit.

19. A lens device as in claim 17, wherein the optical axis extends through the focusing lens and the projecting portion of the lens unit has an arcuate groove formed on an outer circumferential surface, the lens device further comprising:

an intermediate member which, accompanying the rotation of the drive ring, rotates around the optical axis and within the arcuate groove of the projecting portion, the coupling member being formed on the intermediate member.

20. A lens device as in claim 18, wherein the optical axis extends through the focusing lens and the projecting portion of the lens unit has an arcuate groove formed on an outer circumferential surface, the lens device further comprising:

an intermediate member which, accompanying the rotation of the drive ring, rotates around the optical axis and within the arcuate groove of the projecting portion, the coupling member being formed on the intermediate member.

21. A lens device as in claim 12, wherein the lens device is a photographic lens device for a camera.

22. A lens device as in claim 12, wherein the base unit is a shutter unit which includes a shutter.

23. A lens device having an optical axis, comprising:

a shutter unit including a shutter and a drive ring which is rotatable around the optical axis of the lens device and is prevented from moving along the optical axis of the lens device;

a focusing lens which is rotatable around the optical axis of the lens device and is rotatably coupled to the shutter unit so that the rotation of the focusing lens around the optical axis of the lens device causes the focusing lens to move along the optical axis of the lens device, relative to the shutter unit, while remaining coupled to the shutter unit;

a coupling member, coupled to the focusing lens over the entire range of motion of the focusing lens along the optical axis of the lens device, rotating integrally with the drive ring to cause the focusing lens to rotate around, and thereby move along, the optical axis in accordance with the rotation of the drive ring, and guiding the focusing lens along the optical axis as the focusing lens moves along the optical axis; and an intermediate member coupled to the drive ring to rotate integrally with the drive ring, the coupling member being positioned on the intermediate member.

24. A camera having an optical axis, comprising:

a shutter unit including a shutter and a drive ring which is rotatable around the optical axis of the camera and is prevented from moving along the optical axis of the camera;

a focusing lens which is rotatable around the optical axis of the camera and is rotatably coupled to the shutter unit so that the rotation of the focusing lens around the optical axis of the camera causes the focusing lens to move along the optical axis of the camera, relative to the shutter unit, while remaining coupled to the shutter unit, the focusing lens having a groove extending along the optical axis of the camera and positioned on an outer circumference of the focusing lens;

a rib, fit into the groove of the focusing lens over the entire range of motion of the focusing lens along the optical axis of the camera, rotating integrally with the drive ring to cause the focusing lens to rotate around, and thereby move along, the optical axis in accordance with the rotation of the drive ring, the interaction of the rib and the groove of the focusing lens guiding the focusing lens along the optical axis as the focusing lens moves along the optical axis; and an intermediate member coupled to the drive ring to rotate integrally with the drive ring, the rib being positioned on the intermediate member.

25. A lens device as in claim 12, wherein the base unit has a housing space therein, the lens device further comprising:
- a lens unit inserted into the housing space of the base unit and being movable relative to the base unit;
- a lens moving mechanism which protrudes into, and is movable inside, the housing space; and
- an intermediate member which includes the coupling member and has a groove, the intermediate member connected to the lens unit with the lens moving mechanism engaged in the groove so that the movement of the lens moving mechanism causes the lens moving mechanism to interact with the groove to move the intermediate member, the movement of the intermediate member causing the lens unit to move relative to the base unit,
- wherein the lens unit includes a notch so that, when the lens unit is inserted into the housing space of the base unit, the lens moving mechanism passes through the notch and engages with the groove of the intermediate member.

26. A lens device as in claim 12, wherein the base unit has a housing space therein, the base unit including a drive ring which is rotatable around the optical axis of the lens device and has a coupling portion which protrudes into the housing space, and the lens device further includes
- a lens unit inserted into the housing space of the base unit, the lens unit being rotatable around the optical axis of the lens device and rotatably coupled to the base unit so that the rotation of the lens unit around the optical axis of the lens device causes the lens unit to move along the optical axis of the lens device, relative to the base unit, and
- an intermediate member which includes the coupling member, the intermediate member connected to the lens unit and having a groove, the coupling portion of the drive ring engaged in the groove so that the rotation of the drive ring causes the coupling portion to interact with the groove to move the intermediate member, the movement of the intermediate member causing the lens unit to rotate around, and thereby move along, the optical axis in accordance with the rotation of the drive ring,
- wherein the lens unit includes a notch so that, when the lens unit is inserted into the housing space of the base unit, the coupling portion of the drive unit passes through the notch and engages with the groove of the intermediate member.

* * * * *

UNITED STATES PATENT AND TRADEMARK OFFICE
CERTIFICATE OF CORRECTION

PATENT NO. : 5,754,896
DATED : May 19, 1998
INVENTOR(S) : Hitoshi AOKI, et al.

It is certified that error appears in the above-identified patent and that said Letters Patent is hereby corrected as shown below:

Title Page, [30] Foreign Priority Data, ADD --JP
-- Jan. 29, 1996 [JP] Japan.......8-012914 --.

Signed and Sealed this

Thirteenth Day of October 1998

Attest:

BRUCE LEHMAN

Attesting Officer

Commissioner of Patents and Trademarks